United States Patent [19]

Zabrocki et al.

[11] 4,370,378

[45] Jan. 25, 1983

[54] LOW DENSITY, EXTRUDED ETHYLENIC POLYMER FOAMS

[75] Inventors: Vincent S. Zabrocki, Newark; Marlin G. Bussey, Thornville, both of Ohio

[73] Assignee: The Dow Chemical Company, Midland, Mich.

[21] Appl. No.: 307,567

[22] Filed: Oct. 1, 1981

Related U.S. Application Data

[63] Continuation of Ser. No. 158,856, Jun. 12, 1980, abandoned, which is a continuation-in-part of Ser. No. 20,681, Mar. 15, 1979, abandoned.

[51] Int. Cl.$^3$ .................. B32B 7/00; C08F 110/02
[52] U.S. Cl. .................. 428/339; 264/53; 264/DIG. 5; 521/79; 521/81; 521/134; 521/143
[58] Field of Search ............ 428/339; 521/79, 143, 521/81, 134

[56] References Cited

U.S. PATENT DOCUMENTS 3,379,802  4/1968  Roley et al. .................. 521/143
3,766,099  10/1973  Kowai et al. .................. 521/143

OTHER PUBLICATIONS

"Crystalline Olefin Polymers", Raff et al, Part I, ©1965, John Wiley & Sons Inc., p. 681.

*Primary Examiner*—Morton Foelak

[57] ABSTRACT

Disclosed are low density foam planks of ethylenic polymers, which planks have a density of from about 0.8 to about 1.6 pounds per cubic foot, dimensional stability, substantially closed-cell structure, a cross-sectional area of at least six square inches and a minimum cross-sectional dimension of at least 0.5 inch. Such foam planks are made from polyethylene resins (e.g., low density polyethylene) by release to lower pressure of a flowable, foamable gel under pressure, e.g., by extrusion foaming, wherein the gel comprises at least one polyethylene resin and at least one volatile blowing agent. The process of making such foam planks is particularly characterized by the improvement wherein the flowable gel is mixed sufficiently to disperse the blowing agent in the gel to an amount from about 13.5 to $35 + 10^{-4}$ moles per gram of the ethylenic polymer and such process is especially beneficial in that it enables the preparation of substantially closed-cell polyethylene foams having densities of from 0.8 to about 1.9 via extrusion foaming in conjunction with certain $C_2$–$C_4$ fluorocarbon blowing agents.

5 Claims, No Drawings

LOW DENSITY, EXTRUDED ETHYLENIC POLYMER FOAMS

CROSS REFERENCE TO RELATED APPLICATION

This application is a continuation of copending application Ser. No. 158,856 which was filed June 12, 1980; which is now abandoned; and which was in turn a continuation-in-part of copending application Ser. No. 020,681, which was filed Mar. 15, 1979 and which is now abandoned.

BACKGROUND OF THE INVENTION

This invention relates to foamed articles of ethylenic polymers. It also pertains to an improvement in a process whereby there are obtained ethylenic polymer foam planks having low density, dimensional stability, and substantially closed-cell structures.

The term "low density ethylenic polymer foam planks" as used herein means ethylenic polymer cellular structures having densities from about 0.8 to about 1.9 pounds per cubic foot (pcf), a cross-sectional area of at least 6 square inches, and a minimal cross-sectional dimension of at least 0.5 inch and such term is especially applicable herein to such cellular structures having densities from about 0.8 to about 1.6 pcf.

The term "substantially closed-cell structures" as used herein means that the foam articles thereby referred to contain less than about 20 (preferably less than about 15) percent of open cells therein.

It is well known to make closed-cell ethylenic polymer resin foams by the process of extrusion foaming wherein a normally solid thermoplastic ethylenic polymer resin such as polyethylene is heat-plastified and mixed under pressure with a volatile material such as 1,2-dichlorotetrafluorethane to form a flowable gel which is then passed through a shaping orifice or die opening into a zone of lower pressure. Upon the release of pressure, the volatile constituent of the gel vaporizes, forming a gas phase cellular structure in the gel which cools to a corresponding cellular foamed solid resin. Desirably, the resulting gas cells are substantially uniform in size, uniformly distributed through the foam body, and closed, i.e., separated from each other by membrane walls of resin. Although a number of general principles are thought to be understood, much of the extrusion foaming technology is empirical, based on experience, and directed to very specific materials and details to produce saleable products of narrowly defined specification.

One of the common requirements of acceptable foam resin products is dimensional stability, i.e., it is desired that the linear dimension and thus the volume of a piece of foam resin not change appreciably, either to shrink or to expand, under ordinary conditions, from the time its manufacture is complete until the time its ultimate useful life is ended. It is also desired that if any appreciable shrinking of a foam is to occur, which is usually the case with a freshly extruded foam, the foam be able to recover within a reasonable period of time to a substantially constant volume close to that of the foam measured shortly after its extrusion.

With respect to dimensional stability, it has been explained that the vapors of volatile material originally present in the cell gradually permeate the cell wall and escape from the foam over a period of time, thereby tending to reduce the inner cell pressure and tending to cause the foam to shrink during that time. However, when the foam is exposed to ambient atmosphere, air and its constituent gases also tend to permeate into the foam through the cell wall over a period of time thereby tending to increase the inner cell pressure. By virtue of the possibly differing relative rates of permeation of blowing agent out of and air into the cellular structure, there exists the potential for the development of a significant pressure differential (relative to ambient air pressure) within such cellular structure with attendant potential shrinking or expansion thereof during the indicated air/blowing agent interchange therein. Accordingly, the difficulties of attaining dimensional stability are particularly acute in foams of relatively low density (high expansion ratio) when the resin membrane cell walls are relatively thin.

The difficulties of attaining dimensional stability are further accentuated in relatively thick foams (i.e., foam planks) since, with such thick foams, the time required to reach substantially constant, commercially acceptable volume is relatively long, i.e., more time is required for rates of diffusion of residual blowing agent out of the foams and air into such foams to balance the pressure therein. Moreover, the problem of attaining satisfactory dimensional stability is especially severe in highly expanded (i.e., low density) foams of non-crosslinked ethylenic polymer resins since the resultant relatively thin membrane cell walls have relatively low strength with which to resist deformation (e.g., shrinkage) due to the aforementioned pressure differential occurring during the blowing agent/air interchange process.

Polyethylene foam planks having thickness greater than about 0.5 inch, dimensional stability, and substantially closed-cell structure are well known items of commerce. Well known end use applications of such planks are found in the packaging, automotive, construction, contact and water sports and appliance markets. However, the substantially closed-cell polyethylene foam planks known to date have foam density greater than 1.6 pounds per cubic foot. Moreover, in the case of substantially closed-cell polyethylene foam prepared by extrusion foaming technology employing the hereinafter described Group I $C_2$–$C_4$ fluorocarbon blowing agents, foams capable of preparation by such process have heretofore been generally limited to those having densities in excess of 2 pounds per cubic foot. In spite of the economic incentive associated with more efficient use of raw materials, attempts to produce polyethylene foam planks having density lower than that indicated above using the conventional extrusion technology known in the art have met with repeated failures. As a result, foam planks of non-crosslinked polyethylene resins having thickness greater than about 0.5 inch and having foam density lower than about 1.6 pounds per cubic foot are not presently commercially available; nor is there presently commercially available an extrusion foaming process employing the indicated Group I $C_2$–$C_4$ fluorocarbon blowing agents for preparing substantially closed-cell polyethylene foam planks having a density of 1.9 pcf or less. Nevertheless, there is a definite need and desire for foam planks having foam density lower than that of conventional planks for the end use applications discussed hereinabove and for a $C_2$–$C_4$ fluorocarbon blowing agent-based extrusion foaming process for the preparation of such low density foams.

Accordingly, an object of this invention is to provide improved polyethylene foam planks. Another object is to provide method and means for making such foam planks. A particular object is to provide such improved method and means for making polyethylene foam planks having dimensional stability, substantially closed-cell structure, and foam density lower than that of the conventional polyethylene foam planks known to date. Other objects and advantages of the present invention are brought out in the description that follows.

SUMMARY OF THE INVENTION

The objects of this invention are obtained in foam planks of non-crosslinked ethylenic polymer resins, said planks having density of from about 0.8 to about 1.6 pounds per cubic foot, dimensional stability, substantially closed-cell structure, a cross-sectional area of at least six square inches, and a minimum cross-sectional dimension of at least 0.5 inch.

Also contemplated within the scope of the present invention is a method for making ethylenic polymer resin foam planks having densities of from about 0.8 to about 1.9 pcf using gel foaming technology in conjunction with the hereinafter described Group I $C_2$-$C_4$ fluorocarbon blowing agents, said method being particularly characterized by an additional mixing step sufficient to disperse said fluorocarbon blowing agent in the gel to an amount from about 13.5 to $35 \times 10^{-4}$ moles per gram of ethylenic polymer resin.

DETAILED DESCRIPTION AND EMBODIMENTS

The non-crosslinked ethylenic polymer resins used in the present invention include polyethylene resins such as low density polyethylene (LDPE) as well as blends of a major proportion of such polyethylene resins with one or more other ethylenic polymer resins (e.g., blends of LDPE with up to about 30% by weight of ethylene copolymers which comprise ethylene and at least one other monoethylenically unsaturated comonomer). Examples of such copolymers include ethylene-propylene copolymer, ethylene-methyl methacrylate copolymer, ethylene vinyl acetate copolymer and the like. Methods of making ethylenic polymer resins described hereinabove are readily known in the art.

The term "low density polyethylene" as used herein means branched polyethylene having a density from about 0.910 to about 0.930 g/cc and a melt index from about 0.5 to about 50 dg/min.

In accordance with this invention, blowing agent comprises at least one volatile fluorocarbon. The term fluorocarbon is used herein to mean halocarbons containing carbon and fluorine atoms, any other atoms being limited to hydrogen or chlorine atoms. The symbol "FC" hereinafter stands for "fluorocarbon" and numbers are chosen for convenience in referring to these fluorocarbon compounds.

In one embodiment of this invention, the blowing agent which provides satisfactory low density ethylenic polymer foam planks comprises at least one fluorocarbon selected from the group I fluorocarbons having two to four carbon atoms in their molecular structure, normal boiling points, i.e., under standard one atmosphere pressure, between $-30°$ C. and $30°$ C. and a value for the critical quantity $T_b - 0.5V_c$ of between 110 to 145 where $T_b$ is the normal boiling point temperature of the fluorocarbon in degrees Kelvin and $V_c$ is its critical mole volume in cubic centimeters per gram-mole. [The critical volume of a substance can be experimentally measured, and the values of many are reported in the literature. It can also be computed as the reciprocal of the critical density, converted to gram-mole basis. Approximate values of critical volume can also be calculated from the molecular structure according to the Lydersen equation as described in "Chemical Process Principles" by Olaf A. Hougen, K. M. Watson and R. A. Ragatz, 2nd Edition, published (1954) by John Wiley & Sons, New York, page 88 and Table 6, page 91. The Lydersen equation is $V_c = 40 + \Sigma \Delta v$ where $V_c$ is the critical volume in cubic centimeters per gram-mole and $\Sigma \Delta v$ is the summation of the contributions for each atom or atomic group that is present, using values set out in Table 6 on page 91 of the publication.] Specific examples of such group I fluorocarbons are 1,2-dichlorotetrafluoroethane (FC-114), 1-chloro-1,2,2,2-tetrafluoroethane (FC-124A), 1-chloro-1,1,2,2-tetrafluoroethane (FC-124), and 1,1,1-trifluoropropane (FC-263). Each of these fluorocarbons has a normal boiling point temperature between $-30°$ to $30°$ C. and a value for $T_b - 0.5V_c$ between 110-145. There can be up to about 0.35 gram-mole of such blowing agent per 100 grams of resin blend in the flowable gel.

In another embodiment, the low density foams of this invention are prepared employing a blowing agent comprises at least one fluorocarbon selected from the group II fluorocarbons consisting of trichlorofluoromethane (FC-11), dichlorodifluoromethane (FC-12), 1,1,2-trichloro-1,2,2-trifluoroethane (FC-113), 1-chloro-1,1-difluoroethane (FC-142B), 1,1-difluoroethane (FC-152A) and 2,2-difluoropropane (FC-272), provided, however that an effective amount (e.g., from about 0.3 to about 3.0 percent, preferably from about 0.5 to about 1.5 percent, by weight based on the weight of the ethylenic polymer resin) of a stability control agent, e.g., stearamide, is used in conjunction with the blowing agent to impart the desired dimensional stability to the resultant foam planks. Stability control agents suitable for such purpose include the long-chain fatty acid/polyol partial esters described in U.S. Pat. No. 3,644,230 as well as the higher alkylamines, fatty acid amides and complete esters of higher fatty acids described in U.S. Application Ser. No. 952,865 (filed Oct. 19, 1978; now U.S. Pat. No. 4,214,054); the teaching of such patent and such application being hereby incorporated by reference.

In yet another embodiment of the present invention, up to about 25 parts by weight of the fluorocarbons of group I can be replaced by at least one fluorocarbon selected from group II, provided that the resultant foam planks are dimensionally stable as defined hereinbelow.

The blowing agent is compounded into the starting ethylenic polymer resins in proportions to make the desired degree of expansion in the resulting foamed cellular product, usually up to about 75-fold volume expansion to make products having aged foam densities down to about 0.013 g/cc (about 0.8 pound per cubic foot). Depending upon the starting proportion of blowing agent, the resulting foam products, i.e., foam planks, of the this invention have densities from about 0.8 to about 1.6 pounds per cubic foot (pcf). The maximum useful proportions of such blowing agent(s) in composition of flowable, foamable gel is in the range of about 0.135 to about 0.35 gram-mole per 100 grams of the starting ethylenic polymer resins.

The blowing agent is compounded into the starting ethylenic polymer resin in conventional fashion to make a flowable gel, preferably in continuous manner, e.g., in a mixing extruder, using heat to plastify the resin blend, pressure to maintain the blowing agent in non-gaseous state, and mechanical working to obtain a thorough mixing of the resin blend and blowing agent. The resulting gel is then cooled if necessary and passed through a suitable die orifice into a zone of low pressure, e.g., normal ambient air temperature, where it expands to a lower density, cellular mass. As the foamed extrusion forms, it is taken away from the extruder, allowed to cool to harden the ethylenic polymer resin, and collected for further processing or storage pending its ultimate end-use.

The resulting ethylenic polymer resin foam planks have densities from about 0.8 to about 1.9, preferably from about 0.8 to about 1.6, more preferably 1.0 to about 1.6, and most preferably from about 1.2 to about 1.5, pounds per cubic foot, dimensional stability, substantially closed-cell structure, a cross-sectional area of at least six square inches, and a minimal cross-sectional dimension of at least 0.5 inch, preferably at least 0.75 inch.

The gas space of the cells of the resulting polyethylene blend foam originally comprises as an essential constituent the particular blowing agent(s) used to make the foams. As time passes, the blowing agent diffuses out of the foam cells and are gradually replaced by air difusing into such cells. Ultimately, the gas space of the foam cells is essentially occupied by air.

It is essential and critical to the present invention that adequate and thorough dispersion of the blowing agent in the ethylenic polymer resins be obtained. More specifically, it is essential and critical to thoroughly disperse from about 13.5 to about $35 \times 10^{-4}$ moles of the fluorocarbon blowing agent(s) per gram of ethylenic polymer resin. The present invention is not limited by the type of mixer used to carry out adequate and thorough mixing of the blowing agent in the ethylenic polymers. A number of well known static or dynamic mixers can be used to thoroughly disperse the fluorocarbon blowing agent in the flowable gel to an amount from about 13.5 to $35 \times 10^{-4}$ moles per gram of ethylenic polymer resin. An attempt to incorporate additional amount of the blowing agent into the gel without thorough mixing would result in an unsatisfactory product. More specifically, the resulting ethylenic polymer resin foam planks would have blow holes, striations in the cross-sectional area and/or uneven cell size distribution and the like.

In one embodiment of this invention, an interfacial surface generator is placed in between the conventional gel extruder and cooler in operative communication therewith. By the term "interfacial surface generator" is meant an in-line motionless mixer, sometimes referred to as a static mixer or static pipe mixer, whose mixing mechanism is generally unrelated to the throughput when the throughput is flowing in the region of streamline flow. Such mixers may be considered as layering mixers wherein the flowing stream is divided and two component parts reshaped and joined together in such a way that the interface between the original elements of the stream is substantially increased. Such mixers are well known in the art and some of these mixers and their mode of operations are described in the following U.S. Pat. Nos. 3,206,170; 3,239,197; 3,286,992; 3,328,003; 3,358,749; 3,382,534; 3,394,924; 3,404,869; 3,406,947; 3,506,244; 3,860,217; and 3,918,688.

In another embodiment of this invention a rotary mixing device containing intermatching studs on the rotar and the outer cylinder shell is placed in between the conventional gel extruder and the cooler in operative communication therewith to ensure adequate and thorough dispersion of the blowing agent in the ethylenic polymer resins.

Finely divided solid materials such as calcium silicate, zinc stearate, magnesium silicate and the like can advantageously be incorporated with the ethylenic polymer or gel prior to expanding the same. Such finely divided materials aid in controlling the size of the cells, and are usually employed in amounts up to one (1) percent by weight of the polymer.

Numerous fillers, pigments, lubricants, antioxidants and the like well known in the art can also be incorporated into the ethylenic polymer as desired.

For the present purposes, dimensional stability of the foam planks refer to changes which occur in foam plank volume, particularly in later stages of manufacture and during subsequent storage of the foam product. The dimensional stability of the foam products is measured by observing the changes in volume occurring in a test specimen of the foam plank as a function of time. The test specimen is obtained by quickly cutting, from the foam product soon, e.g., within five minutes, after its formation, a piece and accurately measuring its overall volume, e.g., by cubic displacement of water. The initial volume of this specimen is arbitrarily selected as the bench mark volume for the subsequent dimensional stability study. The foam plank specimen is exposed to air at atmospheric pressure and ordinary room temperature; its volume is re-measured from time to time and related on volume percentage basis to the initial volume.

In general manufacturing practice, an ethylenic polymer foam plank is considered to be dimensionally stable for practical purposes if the minimum volume to which the foam plank shrinks is not less than about 85, preferably not less than about 90, percent of the initial bench mark volume, and if the volume of the foam plank four weeks, preferably three weeks, after its extrusion is not less than 90 percent of the initial volume and is substantially constant thereafter under ambient atmospheric conditions. The term "dimensionally stable" in reference to the subject ethylenic polymer foam planks is used herein in the sense of the foregoing definitive description.

The specific working examples that follow are intended to illustrate the invention but are not to be taken as limiting its scope. In the examples, parts and percentages are by weight unless otherwise specified or required by the context.

EXAMPLE 1

Polyethylene have a melt index of 2.3 and a density of 0.921 g/cc is introduced to a plastics extruder having the usual sequential zones denominated by a feed zone, compression zone, metering zone and mixing zone. The normally solid polyethylene is heat-plastified in the extruder and forwarded under pressure of the screw to which a volatile fluorocarbon 1,2-dichlorotetrafluoroethane, is then injected as the blowing agent. The body of mass containing liquid blowing agent and molten polymer is then mixed via conventional mixing technique known in the art of producing cellular polyethylene. The partially mixed gel then passes through an intensive mixer with an average residence time of 4.0 minutes. The intensive mixer used in this example has a rotating stud rotor enclosed within a housing which also has a studded internal surface that intermeshes with the studs on the rotor, the gel flow being in a generally axial direction. The variable speed rotor creates a wide selection of mixing intensity. The intermeshing studs of the mixer had a relative velocity of 25 feet per minute. The gel leaving the intensive mixer is then cooled to approximately 105° C. and is thereafter extruded or discharged through an orifice into a zone of lower pressure, e.g., the atmosphere, wherein the extruded material expands to form a cellular body.

Talc was added along with the polymer to aid in controlling the size of the cells. Blowing agent is increased in a stepwise manner while carefully examining the resultant foam product. A plurality of quality stable foams are produced as shown in Tables I and II. The nucleator, talc, is varied inversely with blowing agent level to hold the average cell size of the foam to about 1.2–1.4 mm. Aged densities of these foams ranged from 2.09 pcf to a low of 1.20 pcf.

TABLE I

| Test No. | FOAM DENSITY[1] | BLOWING AGENT[2] CONCENTRATION[3] | TALC CONCENTRATION[3] |
|---|---|---|---|
| 1.1* | 2.09 | 23 | 0.35 |
| 1.2 | 1.64 | 27 | 0.20 |
| 1.3 | 1.40 | 33 | 0.10 |
| 1.4 | 1.20 | 38 | 0.06 |

Notes:
*Not an example of this invention
[1]Density of foam plank aged for a minimum of 90 days in pounds per cubic foot
[2]1,2-dichlorotetrafluoroethane
[3]Concentration in parts per hundred of polymer.

TABLE II

| Test No. | CROSS-SECTION OF FOAM (INCHES) | FOAM DENSITY (PCF)[1] | VERTICAL COMPRESSIVE STRENGTH (psi)[2] | TENSILE STRENGTH psi[3] MACHINE | TENSILE STRENGTH psi[3] CROSS DIRECTION | COMPRESSIVE CREEP (%)[4] |
|---|---|---|---|---|---|---|
| 2.1* | 1.75 × 7 | 2.09 | 8.4 | 61.6 | 38.6 | .6 |
| 2.2 | 1.6 × 7 | 1.64 | 7.1 | 51.0 | 28.6 | 1.6 |
| 2.3 | 1.3 × 7 | 1.40 | 4.6 | 62.0 | 29.2 | 5.4 |
| 2.4 | 1.125 × 7¼ | 1.20 | 3.7 | 56.0 | 27.0 | 19.0 |

Notes:
*Not an example of this invention.
[1]Density of foam plank aged for a minimum of 90 days.
[2]Vertical compressive strength at 25% deflection measured per ASTM D-3575-77-B.
[3]Tensile strength measured per ASTM D-3575-77-E.
[4]Compressive creep at 1.0 psi after 1 week measured per ASTM D-3575-77-BB.

EXAMPLE 2

Polyethylene with a melt index of 0.7 and a density of 0.922 is extruded through the same process as described in Example 1. Residence time within the intensive mixer is reduced to 2.0 minutes. Relative velocity of the intermeshing studs is 42 feet per minute. A plurality of quality, stable foams are produced with various 1,2-dichlorotetrafluoroethane levels as shown in Tables III and IV.

TABLE III

| TEST NO. | FOAM DENSITY[1] | BLOWING AGENT[2] LEVEL[3] | TALC[3] | MIXER IMPELLER SPEED[4] |
|---|---|---|---|---|
| 3.5 | 1.88 | 24 | .25 | 15.7 |
| 3.6 | 1.39 | 31 | .06 | 23.5 |
| 3.7 | 1.28 | 36 | .04 | 32.0 |
| 3.8 | 1.10 | 47 | — | 63.0 |

Notes:
[1], [2] and [3]Same as Table I
[4]Speed in feet per minute.

TABLE IV

| Test No. | CROSS SECTION (INCHES) | FOAM DENSITY (PCF)[1] | AVERAGE COMPRESSIVE STRENGTH (psi)[2] | COMPRESSIVE CREEP (%)[3] | OPEN-CELL CONTENT (%)[4] |
|---|---|---|---|---|---|
| 4.5 | 1.9 × 9.0 | 1.88 | 8.4 | .8 | 0 |
| 4.6 | 2.23 × 9.0 | 1.39 | 6.3 | 2.7 | 9.9 |
| 4.7 | 2.0 × 9.0 | 1.28 | 5.8 | 7.5 | 1.1 |
| 4.8 | 1.7 × 9.0 | 1.10 | 4.9 | ND | 7.5 |

Notes:
[1]Density of foam plank aged for a minimum of 90 days.
[2]Average compressive strength at 25% deflection measured per ASTM D-3575-77-B.
[3]Compressive creep at 1.0 psi, after 1000 hours measured per ASTM D-3575-77-BB.
[4]Open-cell content measured per ASTM D-3575-77-DD.

Volume changes in percent based on 5 minute initial volume have been measured on Test No. 4.6 and repeated in Table V. The sample which is a typical of the foam planks of the present invention is dimensionally stable as defined hereinabove.

TABLE V

| Test No. | Foam Density (pcf) | Foam Volume Changes in Percent Based on 5-Minute Initial Volume Volume Percent After Time in Days 1 | 4 | 9 | 18 | 19 | 24 |
|---|---|---|---|---|---|---|---|
| 4.6 | 1.39 | 88.4 | — | 87.6 | 86.0 | — | — |
| 5.2 | 1.30 | 96.4 | 96.6 | — | 96.7 | — | — |

EXAMPLE 3

Polyethylene used in Example 2 is extruded through the same processing equipment as described in Example 1. Average residence time within the intensive mixer is 4.0 minutes with the intermeshing studs having a relative velocity of 31 feet per minute. Stearamide at 0.75 pounds per 100 pounds of polymer is added along with 19.83 moles of dichlorodifluoromethane per gram of polymer. The resulting foam plank has a cross-section of 1.7 in.×7.9 in. and a density of 1.3 pcf. Volume changes in percent based on 5 minute initial volume has been measured and reported in Table V as Test No. 5.2.

As seen from Table V, the sample of Test No. 5.2 is dimensionally stable as defined hereinabove.

In place of the particular ethylene polymer or blowing agent used in the preceding examples, there can be used other ethylenic polymers or blowing agents with substantially similar results in obtaining low density foam planks having dimensional stability and substantially closed-cell structure.

In place of the particular mixing device used in the preceding examples, one or more of the other mixing devices described hereinabove can also be used with substantially similar results.

EXAMPLE 4

The process as described in Example 1 was duplicated with replacement of the rotary mixing device by five identical elements of in-line motionless mixers. Said static mixers were of the Sulzer Brothers Design licensed by Koch Engineering Co. Inc., each element having 15 corrugated sheets and an L/D ratio of 1.0. Each element also being aligned 90° about the flow axis from the adjacent elements. 1,2-Dichlorotetrafluoroethane at 35 parts per 100 parts of polymer was injected and mixed via conventional and static mixer techniques. Talc was added at 0.08 parts per 100 parts of polymer for cell size control. The resulting foam plank had a density of 1.41 pcf and a cross-section of 1.5 in.×7.8 in.

EXAMPLE 5

Polyethylene used in Example 2 is extruded through the same processing equipment as described in Example 1. Average residence time within the intensive mixer is 4.0 minutes with the intermeshing studs having a relative velocity of 45.5 feet per minute. Stearamide at 1.5 pounds per 100 pounds of polymer is added along with 0.04 parts of talc. A mixed blowing agent was used consisting of 70% by weight of dichlorodifluoromethane and 30% by weight of trichlorofluoromethane. Total blowing agent mass rate being 28 parts per 100 parts of polymer. The resulting foam had a cross-section of 1.79 in.×8.1 in. and a density of 1.44 pcf after five days of cure time. Volume change based on 5 minute initial volume was 90.6% after 5 days of aging.

What is claimed is:

1. As an article of manufacture, an ethylenic polymer resin extruded foam plank having a density of from about 0.8 to 1.6 pounds per cubic foot, dimensional stability, substantially closed-cell structure, a cross-sectional area of at least 6 square inches, and a minimal cross-sectional dimension of at least 0.5 inch, wherein said ethylenic polymer resin consists essentially of non-crosslinked low density polyethylene and wherein said foam plank contains less than about 20 percent of open cells therein.

2. An article of manufacture according to claim 1 wherein the foam plank has a density from about 1.0 to about 1.6 pounds per cubic foot.

3. An article of manufacture according to claim 1 wherein the foam plank has a density from about 1.2 to about 1.5 pounds per cubic foot.

4. An article of manufacture according to claim 1 wherein the foam plank has a mininal cross-sectional dimension of 0.75 inch.

5. An article of manufacture according to claim 1 wherein the gas space of the foam plank cells ultimately comprises air as the predominant constituent therein.

* * * * *